United States Patent [19]
Abdellatif et al.

[11] Patent Number: 5,698,094
[45] Date of Patent: Dec. 16, 1997

[54] DEVICE FOR BIOLOGICAL TREATMENT OF LIQUID, ESPECIALLY SEWAGE

[75] Inventors: Smati Abdellatif, Suresnes; Valentina Lazarova, Le Pecq, both of France

[73] Assignee: Degremont, Rueil-Malmaison, France

[21] Appl. No.: 631,005

[22] Filed: Apr. 12, 1996

[30] Foreign Application Priority Data

Apr. 21, 1995 [FR] France .................... 95 04833

[51] Int. Cl.⁶ .................................................. C02F 3/08
[52] U.S. Cl. ................... 210/151; 210/194; 210/195.4; 210/629
[58] Field of Search ......................... 210/150, 151, 210/194, 195.3, 195.4, 220, 629

[56] References Cited

U.S. PATENT DOCUMENTS

| | | | |
|---|---|---|---|
| 3,133,017 | 5/1964 | Lambeth | 210/629 |
| 4,137,171 | 1/1979 | Yokata | 210/150 |
| 4,230,563 | 10/1980 | Roesler | 210/629 |
| 4,253,949 | 3/1981 | Hines et al. | 210/629 |
| 4,374,730 | 2/1983 | Brahn et al. | 210/195.4 |
| 4,407,718 | 10/1983 | Pollock | 210/220 |
| 5,338,445 | 8/1994 | Zumbragel et al. | 210/150 |

FOREIGN PATENT DOCUMENTS

| | | |
|---|---|---|
| 1079088 | 11/1954 | France. |
| 2707183 | 9/1995 | France. |
| 34 16 193 | 11/1984 | Germany. |
| 43 33 175 | 3/1995 | Germany. |
| 1-043393 | 2/1989 | Japan. |
| 1-180297 | 7/1989 | Japan. |
| 4-090894 | 3/1992 | Japan. |

*Primary Examiner*—Christopher Upton
*Attorney, Agent, or Firm*—Pollock, Vande Sande & Priddy

[57] ABSTRACT

A device for the biological treatment of liquids, especially sewage, including at least two compartments between which a vertical wall is inserted so that the compartments communicate with each other by free passages above and below the wall. The liquid to be treated is introduced into the compartments which contain particles which are supports for microorganisms exhibiting a density that is lower than that of the liquid to be treated. A gas is injected into the lower part of one of the compartments in order to establish, in the two compartments, a concurrent, continuous and orderly circulation of the multiphase mixture consisting of the liquid, solid and gaseous phases. In the lower part of the compartment not having gas injection, and above the recovery of the treated liquid, in the region where the change takes place in the direction of the flow passing from one compartment to the other, a system is provided for separating the less dense phases (particles, gas) from the multiphase mixture. The system includes at least two arrays of vertically staggered obstacles arranged across the multiphase flow.

9 Claims, 3 Drawing Sheets

1

DEVICE FOR BIOLOGICAL TREATMENT OF LIQUID, ESPECIALLY SEWAGE

FIELD OF THE INVENTION

The present invention relates to a device for the treatment of a liquid by a biological route. It refers more particularly to the use of a process for setting in motion particles which are supports for microorganisms in a liquid which is to be treated by these microorganisms. This invention applies especially to the biological treatment of sewage.

BACKGROUND OF THE INVENTION

There is a known process (FR-A-2 707 183) for setting in motion particles which are supports for microorganisms in a liquid to be treated by the microorganisms, according to which particles which are supports for microorganisms, of a density lower than that of the liquid to be treated, are introduced into a reactor with two zones bounded by a vertical wall leaving free passages below and above the said wall, the reactor is fed with liquid to be treated and a gas is injected into the lower part of one of the zones of the reactor so as to establish a concurrent, continuous and orderly circulation of the liquid, solid and gaseous phases in the two zones.

This same publication describes a biological treatment plant which includes at least two compartments communicating with each other, each of these compartments comprising an individual gas injection system and constituting a reactor with two zones bounded by a vertical wall leaving free passages above and below said wall, at least one of these compartments making use of the process as defined above.

Experience has shown that during the operation of such a reactor an entrainment of the particles laden with biomass by the treated liquid may arise, and this requires the presence of sedimentation systems in order to separate off these particles which are entrained by the treated liquid and systems for recycling of the particles thus recovered into the reactor. These additional means burden the cost of such plants and are not always satisfactory.

BRIEF DESCRIPTION OF THE INVENTION

The present invention has therefore set for itself the objective of producing in the reactor a system which makes it possible to separate from the three-phase mixture (liquid, solid and gaseous phases) the less dense phases, that is to say the particles laden with biomass and the gas, without hampering the circulation of the other phases and while simultaneously ensuring an immediate recycling of the particles into the circulation flow of the three-phase mixture maintained in the reactor.

Starting from the state of the art specified above, the present invention therefore provides a device for biological treatment, comprising at least two compartments between which a vertical wall is inserted so that the compartments communicate with each other by free passages above and below wall. The liquid to be treated is introduced into the compartments which, furthermore, contain particles which are supports for microorganisms exhibiting a density that is lower than that of the liquid to be treated. A gas is injected into the lower part of one of the compartments in order to establish in the two compartments a concurrent, continuous and orderly circulation of the multiphase mixture consisting of the liquid, solid and gaseous phase. In this device in the lower part of the compartment not having the gas injection, and in the region where the change takes place in the direction of the flow passing from one compartment to the other and above the recovery of the treated water, a system is provided for separating the less dense phases (particles, gas) from the multiphase mixture, including at least two arrays of vertically staggered obstacles arranged across the multiphase flow and constituting chicanes.

According to a preferred embodiment of this device the said obstacles forming chicanes consist of surfaces which are inclined in relation to the main direction of the multiphase flow, the angle of inclination being regulated as a function of the hydrodynamic characteristics of the flow, of the physical properties of the phases and of the geometrical configuration of the device. This angle in relation to the horizontal is preferably of the order of 20° to 40°, especially approximately 30°.

According to the invention, the said obstacles have a planar configuration. They may be inclined transversely to the main direction of the multiphase flow.

According to alternative forms of the device forming the subject of the invention, the said obstacles which are may have curved or prismatic configurations. They are preferably mounted on securing supports enabling them to be adjusted in height.

BRIEF DESCRIPTION OF THE FIGURES

Other characteristics and advantages of the present invention will emerge from the description given below with reference to the attached drawings which illustrate various examples of the embodiment thereof which are devoid of any limiting nature. In the drawings.

DETAILED DESCRIPTION OF THE INVENTION

Figure 1:
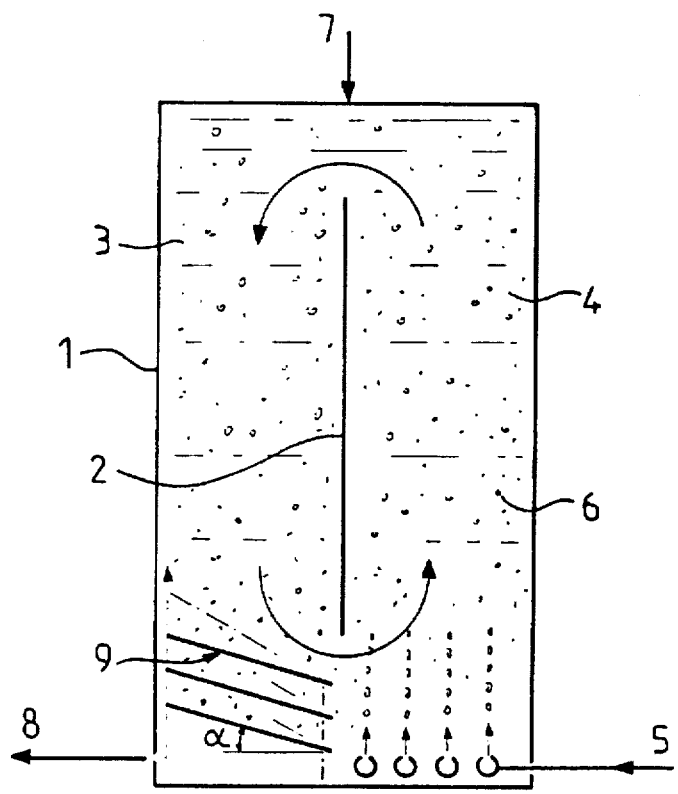
FIG. 1 is a diagrammatic view showing an improved reactor according to the present invention, in vertical section.
Figure 3:
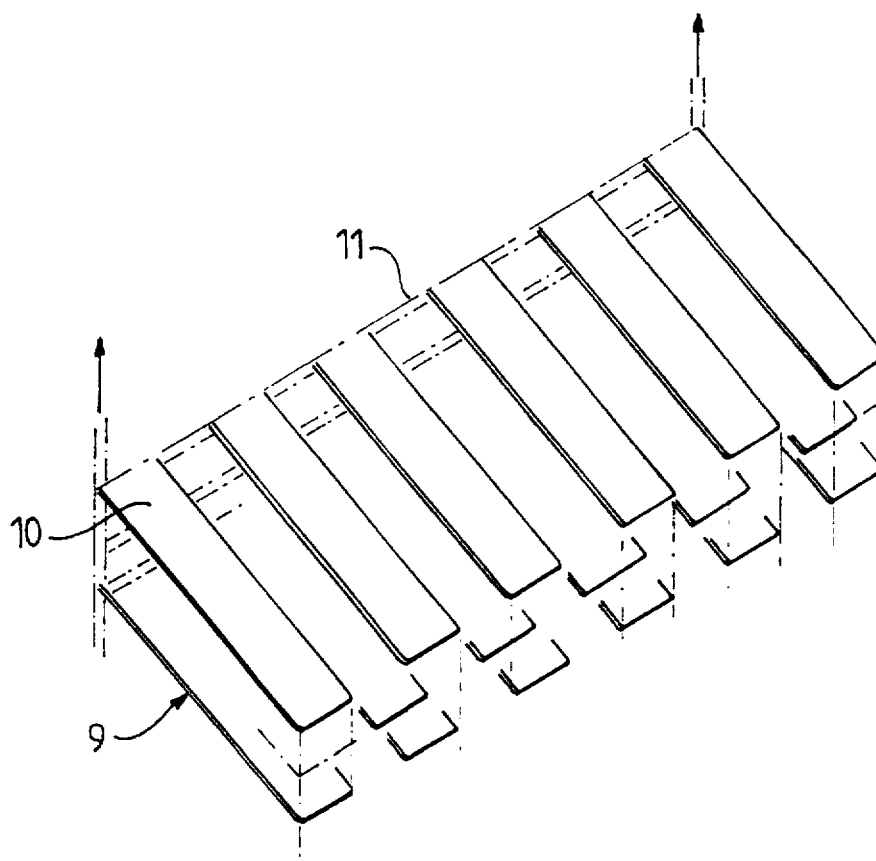
FIG. 3 is a partial larger-scale view illustrating the means provided by the invention for ensuring the separation of the less dense phases (particles, gas) from the three-phase mixture.
Figure 2:
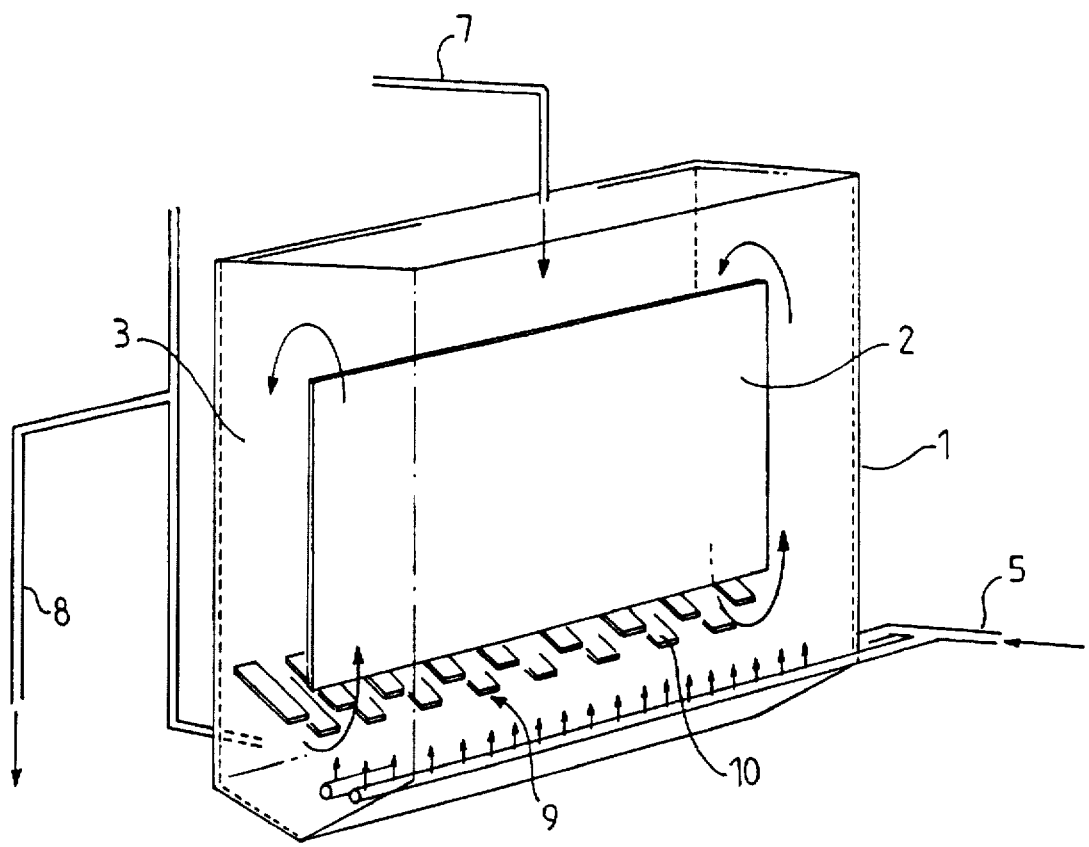
FIG. 2 is also a diagrammatic view illustrating an example of embodiment of the reactor according to the invention, in perspective.

If reference is made to the drawings, and especially to FIGS. 1 to 3, it can be seen that the reactor 1 according to the present invention is of the type described in the above-mentioned publication. It therefore comprises a vertical wall 2 which bounds two zones 3 and 4 communicating with each other by passages above and below this wall 2. A system for injecting gas 5 (for example air) is positioned in the lower part of one of the zones, in this case zone 4. Reactor 1 includes granular particles 6 whose density is lower than that of the liquid to be treated. The microorganisms needed for the biochemical conversions, for example for the purification of sewage, are bound to and developed on the support particles 6. The liquid to be treated is introduced with the aid of a conduit 7 in the upper part of the reactor 1, in this nonlimiting example of embodiment. Under the effect of the driving force resulting from the air bubbles introduced by the conduit 5, the three, solid, liquid and gaseous, phases enter into continuous and orderly circulation according to the arrows shown in FIGS. 1 and 2. The treated liquid is removed with the aid of a pipeline 8 provided at the base of the compartment 3.

In order to avoid an entrainment of the biomass-laden support particles with the treated liquid discharged via the pipeline 8, the invention provides a system for the separation of the less dense phases (particles, gas), which is positioned in the lower part of the compartment not comprising the means for injecting gas 5, above the recovery 8 of the treated water, in the zone of this compartment where the change takes place in the direction of the flow passing from one compartment to the other.

Figure 4:
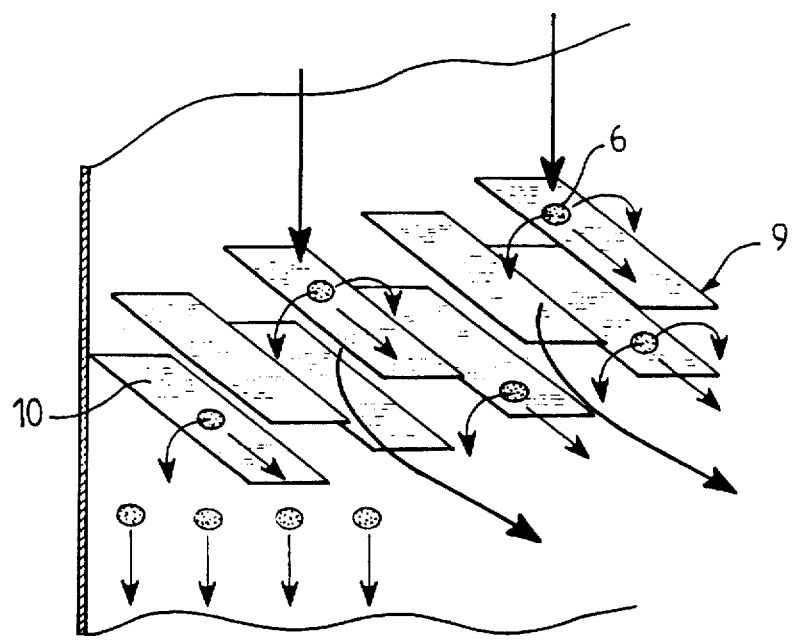
FIG. 4 is a diagram illustrating the operation of the improvement which is the subject of the invention, in perspective.
Figure 5:
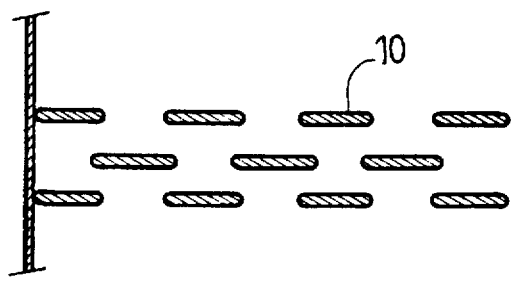
FIGS. 5 to 8 are diagrammatic views representing various examples of embodiment of the obstacles, which are provided by the invention for separating the less dense phases from the three-phase mixture.

In the example of embodiment illustrated by FIGS. 1 and 2, this separation system is positioned in the lower part of the compartment 3 of the reactor 1. It comprises at least two arrays of obstacles, indicated as a group by reference 9, these vertically staggered obstacles arranged across the multiphase flow, so as to constitute chicanes. This arrangement can be seen clearly when FIGS. 2, 3 and 4 are examined. By virtue of this arrangement, a zone of water which is free from light particles such as 6 is produced above the recovery 8 of the treated water.

In the preferred example of embodiment, illustrated by FIGS. 1 to 5, the obstacles forming chicanes are produced in the form of planar surfaces such as 10, which are inclined in relation to the main direction of the multiphase flow in the reactor 1. The angle of inclination α of each planar surface 10 in relation to the horizontal can be adjusted as a function of the hydrodynamic characteristics of the flow of the multiphase mixture, of the physical properties of the phases and of the geometrical configuration of the device. By way of nonlimiting example, it is stated that this angle of inclination may be between approximately 20° and 40°, preferably 30°.

With reference to FIG. 3, it can be seen that the inclined surfaces 10 are mounted on horizontal supports 11, for example through the intermediacy of articulations forming hinges of any known type, it being possible for these supports to be adjusted in height, as shown by the vertical arrows represented in this FIG. 3. It is thus possible to adjust the value of the angle α and to flatten the whole set of the arrays of obstacles 9 against the wall of the reactor when the latter is in a cleaning stage, emptied of the liquid effluent to be treated and filled solely with the particles. By virtue of this arrangement, the obstacles are not subjected to the load resulting from the weight of the particles accumulated in the reactor. On the other side of the horizontal supports 11 the combination of the obstacles forming chicanes 9 is supported by any conventional system.

According to the invention, and as can be clearly seen in FIG. 1, the system of obstacles forming chicanes 9, which is mounted on the supports such as 11, is separated from the wall of the reactor 1 in order to permit the circulation of the gas bubbles at this point of the reactor 1.

FIG. 4 clearly illustrates the operation of the device forming the subject of the invention. It can be seen that the presence of the obstacles 10 forming chicanes ensures the separation of the particles such as 6, which slide over the said obstacles and which are thus brought back into the multiphase flow (see FIG. 1) in the zone where the change takes place in the direction of the flow passing from compartment 3 to compartment 6 during the continuous circulation of this flow. By virtue of this arrangement any entrainment of the biomass-laden particles 6 by the treated liquid discharged via the pipeline 8 is avoided.

Figure 6:
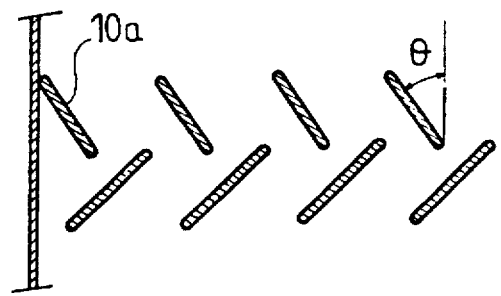
Figure 7:
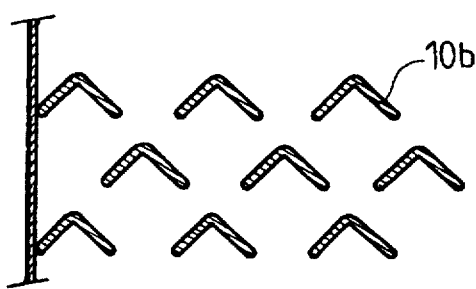
Figure 8:
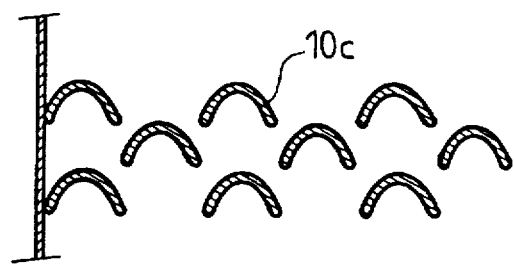

It is, of course, possible to produce the obstacles in any form other than that illustrated by FIGS. 1 to 5. FIGS. 6 to 8 illustrate various possible forms:

in FIG. 6 planar surfaces 10a are used which are inclined transversely at an angle θ in relation to the main direction of the multiphase flow;

in FIG. 7 the obstacles forming chicanes 10b have a prismatic configuration, and in FIG. 8 the obstacles forming chicanes 10c have a curved configuration.

Naturally, these are merely possible examples, which do not imply any limitation.

From reading the above description it follows that the device forming the subject of the invention makes it possible, in fact, to produce a separation of the less dense phases, with the lowest density, from the multiphase mixture, this separation making it possible in particular to avoid an entrainment of the biomass-laden particles by the treated liquid. It will be noted that this separation takes place without hampering the circulation of the other phases and without any significant dissipation of the kinetic energy of the phases in circulation. Moreover, the device forming the subject of the invention allows the flow of the multiphase mixture to be improved in places where the change takes place in the direction of the flows, under the partition wall 2 of the reactor 1.

We claim:

1. A device for the biological treatment of sewage liquids, comprising:

at least two compartments between which a vertical wall is inserted so that the compartments communicate with each other by free passages above and below the wall;

means for introducing the liquid to be treated into the compartments which contain particles that are supports for microorganisms exhibiting a density that is lower than that of the liquid to be treated;

means for injecting gas, into the lower part of one of the compartments, in order to establish, in the two compartments, a concurrent, continuous and orderly circulation of a multiphase mixture including liquid, solid and gaseous phases; wherein at least two arrays of vertically staggered obstacles are located in a lower part of the compartment not including the gas injection means, and positioned above means for recovering the treated liquid, and in a region where a change takes place in the direction of the flow passing from one compartment to the other, the obstacles positioned across the multiphase flow and constituting chicanes for separating the less dense phases (particles, gas) from the multiphase mixture.

2. Device according to claim 1, wherein the obstacles forming chicanes including surfaces that are inclined in relation to a main direction of the multiphase flow, an angle of inclination ($\alpha$) being regulated as a function of the hydrodynamic characteristics of the flow, of the physical properties of the phases and of the geometrical configuration of the device.

3. Device according to claim 2, wherein the said angle of inclination ($\alpha$) in relation to the horizontal is of the order of 20° to 40°.

4. Device according to claim 1, wherein the obstacles have a planar configuration.

5. Device according to claim 4, wherein the obstacles are inclined transversely to the main direction of the multiphase flow.

6. Device according to claim 1, wherein the obstacles have a curved configuration.

7. Device according to claim 1, wherein the obstacles have a prismatic configuration.

8. Device according to claim 1, wherein the obstacles are mounted on securing supports which are adjustable in height.

9. Device according to claim 1, wherein the obstacles are separated from the wall of the reactor in order to permit the circulation of the gas bubbles between the wall and the obstacles.

* * * * *